United States Patent
Archer

(10) Patent No.: US 6,683,870 B1
(45) Date of Patent: Jan. 27, 2004

(54) METHOD AND SYSTEM FOR MULTICASTING CALL NOTIFICATIONS

(75) Inventor: Michael Archer, Dallas, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/104,570

(22) Filed: Jun. 25, 1998

Related U.S. Application Data

(62) Division of application No. 08/751,023, filed on Nov. 18, 1996, now abandoned, which is a division of application No. 08/798,350, filed on Feb. 10, 1997, now abandoned.

(51) Int. Cl.[7] ............................................. H04L 12/66
(52) U.S. Cl. ...................... 370/356; 370/390; 370/432
(58) Field of Search ................................ 370/259, 260, 370/261, 270, 351, 352, 353, 354, 355, 356, 390, 432; 379/201, 202, 205, 209, 211, 212, 219, 220

(56) References Cited

U.S. PATENT DOCUMENTS

| | | | |
|---|---|---|---|
| 4,100,377 A | | 7/1978 | Flanagan ..................... 179/15 |
| 4,771,425 A | | 9/1988 | Baran et al. .................. 370/85 |
| 4,969,184 A | | 11/1990 | Gordon et al. .............. 379/100 |
| 5,029,196 A | | 7/1991 | Morganstein ................. 379/67 |
| 5,333,173 A | * | 7/1994 | Seazholtz et al. ............ 379/45 |
| 5,361,256 A | * | 11/1994 | Doeringer et al. .......... 370/390 |
| 5,436,957 A | | 7/1995 | McConnell ................... 379/88 |
| 5,440,620 A | | 8/1995 | Slusky ........................ 379/100 |
| 5,481,600 A | | 1/1996 | Alesio ......................... 379/114 |
| 5,497,411 A | | 3/1996 | Pellerin ....................... 379/59 |
| 5,511,114 A | | 4/1996 | Stimson et al. ............. 379/114 |
| 5,526,353 A | | 6/1996 | Henley et al. ............. 370/60.1 |
| 5,553,135 A | * | 9/1996 | Xing ........................... 379/399 |
| 5,590,181 A | | 12/1996 | Hogan et al. ............... 379/114 |

(List continued on next page.)

FOREIGN PATENT DOCUMENTS

| | | |
|---|---|---|
| EP | 0549126 | 6/1993 |
| EP | 0583135 A | 2/1994 |
| EP | 0740480 A | 10/1996 |
| EP | 0767568 A | 4/1997 |
| EP | 0802690 A | 10/1997 |
| JP | 09168033 A | 6/1997 |
| JP | 09168051 A | 6/1997 |
| JP | 09168063 A | 6/1997 |
| JP | 09168064 A | 6/1997 |
| JP | 09168065 A | 6/1997 |
| JP | 09172459 A | 6/1997 |
| JP | 09172462 A | 6/1997 |
| WO | 9501691 A | 1/1995 |
| WO | 9522221 A | 8/1995 |

(List continued on next page.)

OTHER PUBLICATIONS

"Follow Me 800 Service", *Newton's Telecom Dictionary*, p. 304; Mar. 1998.
"Telephony Over the Internet How to Make This Into a Public Service", Rinde, et al., pp. 1–18.
PC Week, Stephanie Lapolla, "Net Call Centers, Voice to Merge", Mar. 31, 1997, p. 10.
Reuters, Nick Louth, "MCI Communications Corporation vaults phone–data divide", Jan. 29, 1997, web page attached.

(List continued on next page.)

*Primary Examiner*—Kwang Bin Yao

(57) ABSTRACT

A method for communication over a network, which can be both analog and digital includes simultaneously transmitting a call notification to a plurality of communication devices. These communication devices include devices such as telephones, pagers, computers, and voice mail systems. The addresses (e.g., telephone numbers) are stored in a database which is queried based on the call notification. For example, this method can be used in a find-me/follow-me system or to initiate a conference call.

24 Claims, 6 Drawing Sheets

U.S. PATENT DOCUMENTS

| | | | |
|---|---|---|---|
| 5,600,704 A | | 2/1997 | Ahlberg et al. |
| 5,604,737 A | | 2/1997 | Iwami et al. ............... 370/352 |
| 5,608,786 A | | 3/1997 | Gordon ...................... 379/100 |
| 5,610,910 A | | 3/1997 | Focsaneanu et al. ........ 370/351 |
| 5,636,216 A | | 6/1997 | Fox et al. ................... 370/402 |
| 5,654,957 A | | 8/1997 | Koyama ..................... 370/355 |
| 5,712,907 A | | 1/1998 | Wegner et al. .............. 379/112 |
| 5,724,355 A | | 3/1998 | Bruno et al. ................ 370/401 |
| 5,724,412 A | | 3/1998 | Srinivasan |
| 5,742,596 A | * | 4/1998 | Baratz et al. ............... 370/356 |
| 5,742,905 A | * | 4/1998 | Pepe et al. .................. 455/461 |
| 5,751,706 A | | 5/1998 | Land et al. ................. 370/352 |
| 5,802,160 A | * | 9/1998 | Kugell et al. ............... 379/211 |
| 5,838,665 A | * | 11/1998 | Kahn et al. ................. 370/260 |
| 5,915,008 A | * | 6/1999 | Dulman ...................... 379/201 |
| 5,995,597 A | * | 11/1999 | Woltz et al. ............. 379/93.24 |
| 6,069,890 A | * | 5/2000 | White et al. ................ 370/352 |
| 6,072,780 A | * | 6/2000 | Johnson, Jr. et al. ....... 370/260 |
| 6,104,799 A | * | 8/2000 | Jain et al. ................... 379/210 |
| 6,205,139 B1 | * | 3/2001 | Voit ........................... 370/389 |
| 6,483,832 B1 | * | 11/2002 | Civanlar et al. ............ 370/390 |

FOREIGN PATENT DOCUMENTS

| | | |
|---|---|---|
| WO | 9619068 A | 6/1996 |
| WO | 9625720 A | 8/1996 |
| WO | 9634341 A | 10/1996 |
| WO | 9638799 A | 12/1996 |
| WO | 9710668 A | 3/1997 |
| WO | 9722211 A | 6/1997 |
| WO | 9723078 A | 6/1997 |
| WO | 9726748 | 7/1997 |
| WO | 9728628 A | 8/1997 |
| WO | 9806201 | 2/1998 |
| WO | 9823080 A | 5/1998 |

OTHER PUBLICATIONS

The Wall Street Journal, "MCI's New Service for Corporate Use Sets 1 Line for Net, Phone", Jan. 30, 1997, web page attached.

Yang, C.: INETPhone: Telephone Services and Servers on the Internet; Apr. 1995; Network Working Group; Request for Comments: 1789; Category: Informational.

Low C: "The Internet Telephony Red Herring", HP Laboratories Technical Report, May 15, 1997, pp. 1–15.

Low C, et al.: "Webin—An Architecture For Fast Deployment of In–Based Personal Services" Workshop Record. Intelligent Network. Freedom and Flexibility: Realising the Promise of Intelligent Network Services, Apr. 21, 1996, pp. 1–12.

Plamen L. Simeonov, et al.: "Ingate: A Distributed Intelligent Network Approach to Bridge Switching and Packet Networks" Proceedings of Sixth International Conference on Computer Communications and Networks, Sep. 22–25, 1997, pp. 358–363.

L. Gys, et al.: "Intelligence in the Network" Alcatel Telecommunications Review, No. 1, 1998, pp. 13–22.

Gareiss R: "Voice Over the Internet" Data Communications, vol. 25, No. 12, Sep. 1996, pp. 93, 94, 96, 98, 100.

Bolot, et al.: "Scalable Feedback Control For Multicast Video Distribution In The Internet" Computer Communications Review, vol. 24, No. 4, Oct. 1, 1994, pp. 58–67.

Davis A.W.: "Videoconferencing Via Pots Now: Proprietary Codecs & Emerging Standards" Advanced Imaging, Jan. 1, 1995, p. 32, 34, 36, 38 and 88.

Estrin, et al.: "Multimedia Over IP: Specs Show The Way" Data Communications, vol. 25, No. 10, Aug. 1, 1996, pp. 93–96 and 98.

Francois Fluckiger: "Multimedia Over The Internet" Proceedings of the European Conference on Multimedia Applications, Services and Techniques, vol. 1, May 28–30, 1996, pp. 3–8.

Gronert, et al: "Van Gateway Services: Easy Does It For E–Mail" Data Communications, vol. 23, No. 6, Apr. 1, 1994, pp. 63/64, 64B and 64D.

Halton K. C.: "The Group 3 Facsimile Protocol" BT Technology Journal, vol. 12, No. 1, Jan. 1, 1994, pp. 61–69.

Jacobs, et al.: "Filling HTML Forms Simultaneously: Coweb–Architecture and Functionality" Computer Networks and ISDN Systems, vol. 28, 1996, pp. 1385–1395.

Katz, et al.: "MMCX Server Delivers Multimedia Here and Now" AT&T Technology, vol. 10, No. 4, Dec. 1, 1995, pp. 2–6.

Koch, et al: ""Gruppe 3" Brachte Den Schneeballeffekt" Funkschau, No. 2, Jan. 15, 1988, pp. 48–50.

Low C: "The Internet Telephony Red Herring" HP Laboratories Technical Report, May 15, 1996, pp. 1–15.

Dr. Hannes P. Lubich: "Videoconferencing For MAC and PC–Initial Experiences With "CU–SEEME"" Switch Journal, No. 1, 1995, pp. 4–9.

Maeno, et al. "Distributed Desktop Conferencing System (Mermaid) Based On Group Communication Architecture" Communications—Rising to the Heights, Denver, Jun. 23–26, 1991, vol. 1, Jun. 23, 1991, pp. 520–525.

Matsuo, et al.: "Personal Telephone Services Using IC–Cards" IEEE Communications Magazine, vol. 27, No. 7, Jul. 1989, pp. 41–48.

Patel, et al.: "The Multimedia Fax–Mime Gateway" IEEE Multimedia, vol. 1, No. 4, Dec. 21, 1994, pp. 64–70.

Henning Schulzrinne: "A Comprehensive Multimedia Control Architecture For The Internet" Proceedings of the IEEE $7^{th}$ International Workshop on Network and Operating System Support for Digital Audio and Video, May 19–21, 1997, pp. 65–76.

Simeonov, et al.: "Ingate: A Distributed Intelligent Network Approach To Bridge Switching and Packet Networks" Proceedings of the International Conference on Computer Communications and Networks, 1997, pp. 358–363.

Tagg E.: "Automating Operator–Assisted Calls Using Voice Recognition" Speech Technology, Man–Machine Voice Communications, vol. 4, No. 2, Mar. 1988, pp. 22–25.

Turletti T: "The Inria Videoconferencing System (IVS)" Connexions, Oct. 1, 1994, pp. 20–24.

"Interactive Media: An Internet Reality" IEEE Spectrum, vol. 33, No. 4, Apr. 1, 1996, pp. 29–32.

"Workstation Communications System" IBM Technical Disclosure Bulletin, vol. 37, No. 9, Sep. 1, 1994, pp. 101–104.

MCI One—Life just got simpler Apr. 25, 1997.

WebPhone Gateway eXchange Server (WGX) May 12, 1998

* cited by examiner

METHOD AND SYSTEM FOR MULTICASTING CALL NOTIFICATIONS

CROSS-REFERENCE TO RELATED APPLICATIONS

The following commonly owned U.S. patent application Ser. No. 08/751,023, filed Nov. 18, 1996, now abandoned, and commonly owned U.S. patent application Ser. No. 08/798,350, filed Feb. 10, 1997, now abandoned, are herein incorporated by reference in their entirety.

FIELD OF THE INVENTION

This invention relates generally to telecommunications and specifically to a method and system for multicasting call notifications.

BACKGROUND OF THE INVENTION

Since the use of the public Internet has become increasingly popular as one of the world's premier sources of communications, new and innovative technologies have been developed to tap into the Internet's vast resources. This new form of communication has sprouted numerous technological innovations and services that benefit both consumers and industry. One of these innovations is the transmission of voice over the Internet.

In the mid to late 1970s, experiments in the transmission of voice over the Internet were conducted as part of an ongoing research program sponsored by the U.S. Defense Advanced Research Projects Agency (DARPA). In the mid 1980s, UNIX-based workstations were used to conduct regular audio/video conferencing sessions in modest quantities over the Internet. These experimental applications were extended in the late 1980s with larger scale, one-way multicasting of voice and video. In 1995 a small company, VocalTec Communications Ltd., commercially introduced a software package that was capable of providing two way voice communications between multi-media PCs connected to the Internet.

Telephony over the Internet offers users a low cost service that is distance and border insensitive. For the current cost of Internet access (at low hourly rates or unlimited use flat fees) the caller can hold a voice conversation with another PC user connected to the Internet. In the case where one or both ends have flat fee connections to the Internet, the call is free of additional charges. This makes Internet telephony an attractive alternative to cost conscious consumers.

Unfortunately, Internet telephony or Voice over Internet Protocol (VOIP) suffers from a number of problems. The voice quality across the Internet is not as good as typical telephone toll quality and there are significant delays experienced during the conversation. In addition, Internet telephones do not have the benefit of the plethora of added services that are available through standard switched telephones.

SUMMARY OF THE INVENTION

The present invention relates to the growing need for a smooth integration of evolving telephony features with evolving computer functionality. The lines between the technologies are becoming increasingly blurred as companies from both disciplines strive to increase their market share, and maximize on the global mobility. This trend to further integrate telephones and PCs should continue as the global market for both technologies expands. Although the trend is clear, the trick is to integrate features without adding expensive equipment, awkward interfaces, or lesser quality.

One specific problem addressed by the present invention is to ensure that call forwarding or "follow me" services can reach customers when not available by phone. Current technology from the telephony standpoint, e.g., existing MCI One service, is restricted to standard telephone devices. The present invention therefore provides a solution that will allow existing technologies to become more flexible and efficient.

Another specific example where the present invention can be used is in "find-me" systems. In a find-me system, a caller calls a subscriber by dialing a single telephone number. The service provider takes this telephone number and consults a database where the subscriber has provided a number of telephone numbers (a call list) where he can be reached. Each of these numbers is then sequentially called until one of the phones is answered. With the present invention, computers and internet telephones can be included in a subscriber's call list.

Yet another specific application of the present invention relates to conferencing, whether it be voice, data, and/or video. The present invention provides the advantage of allowing a party who is initiating a conference to contact one telephone number that will automatically cause all other participants to be simultaneously notified.

In one aspect, the present invention provides a method for communication over a network which can be both circuit-switched and packet-switched. In this method, a call notification is simultaneously broadcast (multicast) to a plurality of communication devices. These communication devices include devices such as telephones, pagers, computers, and voice mail systems. The addresses (e.g., telephone numbers) are stored in a database that is queried based on the call notification. For example, this method can be used in a find-me system or to initiate a conference call.

In another aspect, the present invention provides a communication system in which a plurality of converters are each operable to sample voice signals and create digital packets that contain a digital representation of the voice signals. Each converter might also create voice signals from a digital packet. A storage device contains a database of records each of which includes a call list of telephone numbers associated with each of a plurality of subscribers. The system also includes a computer system that operates under control of software. Upon receipt of a call notification, the software causes the computer system to query the database to retrieve a record associated with the call notification and to multicast digital call notification packets to a plurality of the converters. The digital notification packets include information relating to the call list of telephone numbers in the received record.

The present invention has a number of advantages over present systems. For example, the present invention can utilize the commonly implemented Internet Protocol (IP), e.g., through an internet service provider (ISP), in place of standard switching. In follow-me systems, a multi-media personal computer can be used as the called party's forwarding number. In other words, by dialing the same telephone number you can communicate with the called party through her computer.

This system reduces the waiting time of the caller by simultaneously ringing all numbers in a primary group of telephone numbers. This system also reduces switch traffic for telephone companies by letting the internet service providers (ISPs) do the routing, in effect turning the internet service providers into mini-telephone companies. This system has all of the functionality of standard "find me" type phone systems, but with the added capability of catching the called party online anywhere in the world as long as they are connected to the ISP in some fashion.

An added functionality is the ability of the ISP to notify the user's computer if they are online and alert them of an incoming phone call. The user could then (using a standard multimedia computer) use a microphone and his computer's soundcard/speakers to complete the call using his PC. The user could also route the call back to his primary group if he so desired in case he missed the call initially.

For conference calling, only a single telephone number needs to be dialed in order to initiate the call. In commercially available systems, each participant must be contacted individually causing the first person to wait while each of the other people is called. Since all of the participants can be contacted simultaneously by use of the invention, much time can be saved.

The flexibility and convenience of the present invention makes it an attractive alternative or enhancement to presently used systems.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention will be first be described with reference to one specific application, namely "follow-me" and "find-me" services. The concepts will then be applied to other applications including conferencing. A "follow-me" service allows a subscriber to provide the service provider with a telephone number where the subscriber can be reached. The subscriber has the opportunity to change this number as often as he would like so that his calls will "follow" him as he moves to different locations. The service is often referred to as call forwarding.

For example, in 1991 MCI Telecommunications Co. (MCI) began offering a Follow Me 800 Service. This service encompassed call forwarding of a personal 800 line. The service differed from local call forwarding in that a caller could contact MCI from anywhere in the world and change the number the 800 line will send its calls to. The 800 number always stayed the same.

Figure 1:
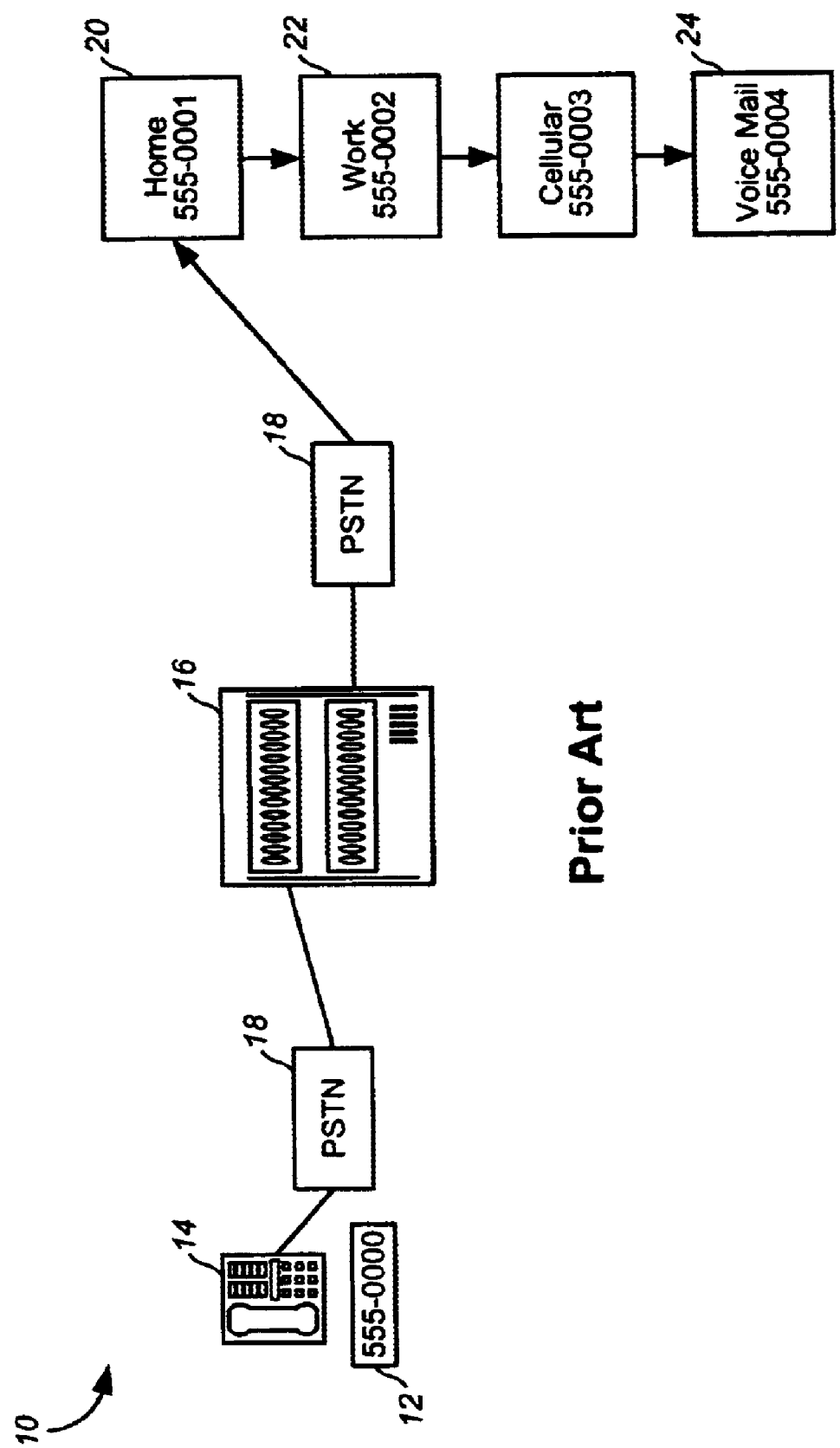
FIG. 1 is a block diagram of a prior art communication system.

A similar service is a "find-me" service which is illustrated in FIG. 1. In this system 10, a caller dials a single telephone number 12 of a called party from an initiating telephone 14. This call is routed over the public switched telephone network (PSTN) 18 to a switch 16. The call is then routed across the PSTN 18 to a telephone associated with a first number 20 in the called party's list, where it is either answered or not answered. If unanswered, then the numbers in the list are automatically dialed in sequence by the switch 16 until one is answered or forwarded to the called party's voice mail or pager 24. Because number dialing is sequential, it can take several minutes to complete. An example of a commercially available find-me service is the MCI One Service.

Figure 2:
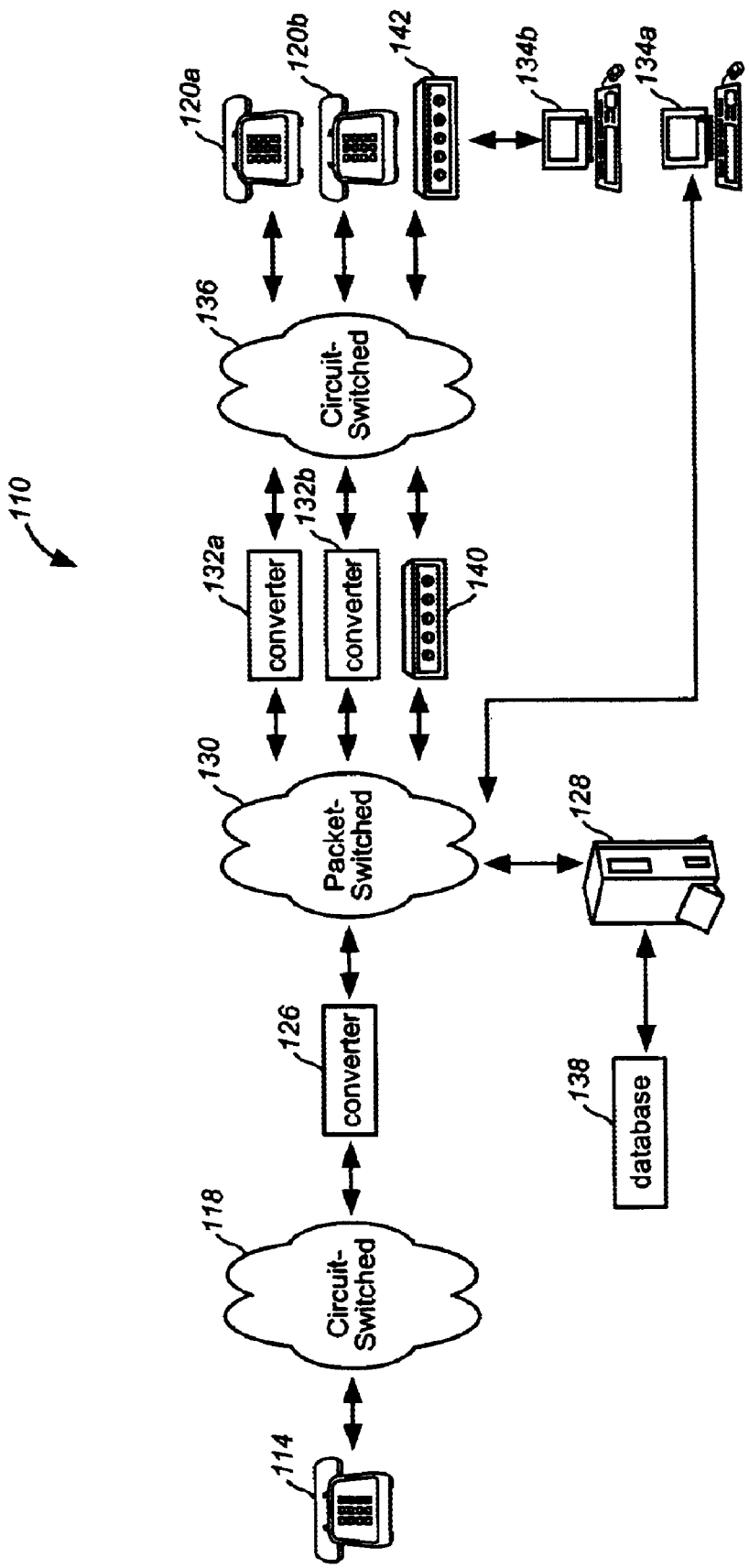
FIG. 2 is a block diagram of a preferred embodiment communication system.

A first embodiment system 110 of the present invention is illustrated in FIG. 2. Before turning to functional blocks of FIG. 2, however, it may be useful to provide a quick overview of the concept behind this embodiment. This embodiment of the present invention is based on Internet Protocol (IP) based voice traffic, where calls are: (1) converted from analog signal to digital signals, (2) split up into IP packets, (3) routed to their destination, and (4) reassembled. In the first embodiment, when an end user dials a single find-me number, the IP packets that make up the call are routed to a packet-switched network. Components within the network receive the header (call originate) and begin to search for a telephone number at which the person being called will answer.

As a specific example, assume a caller places a phone call. This call is routed through the ordinary phone system to a special converter where the receiving phone number is assembled into digital packet(s). These packets are routed to a computer system where the receiving phone number is extracted. The computer system queries a database with the phone number and the database returns all of the numbers in the called party's record. Each of these phone numbers are assembled into digital packet(s) and routed to converters which return the call notifications to the ordinary phone system.

This embodiment system, unlike current find-me systems, can simultaneously multicast out IP packets designed to ring all of the telephone numbers at destinations in the called party's list at once. Telephone numbers at several locations can be grouped together to ring at once. If any one of these locations pick up, a response IP packet is sent to the packet-switched network. Upon receipt of the response packet, the packet-switched network begins routing the packets from the caller to the called party's destination.

In the preferred embodiment, the called party's list of telephone numbers is divided in a number of groups. If no numbers in the primary group answer, the packet-switched network can then forward the call to the secondary group, which typically consists of a voice mail, or pager number. More groups could also be included.

Referring now to FIG. 2, a call notification can be initiated at an initiating communication device 114. The initiating communication device 114 is typically a telephone. While referring to the initiating device 114 as a telephone 114, it is understood that other devices such as electronic communication devices or computers can be used. A telephone 114 can be either a land-line or cellular (analog or digital) without deviating from the spirit of the invention.

Telephone 114 is connected to circuit-switched communication network 118 in the typical manner. A circuit-switched network is a network which uses an entire telephone channel for every phone call, fax or data connection and routes the call from sender to receiver as if establishing a single end-to-end circuit. A circuit-switched network is sometimes referred to as a traditional network. In the preferred embodiment, network 118 is a POTS (plain old telephone service) network. This network can be either a public system (PSTN) or a private system. Alternatively, proprietary networks can be used.

Circuit-switched network 118 can be either an analog network, a digital network, or a combination of both. An analog communication network is a network which transmits analog signals without regard to their content. The signals may represent analog data (e.g., voice) or digital data (e.g., binary data, maybe from a modem). The analog network may include amplifiers (not shown) to boost the energy in the system. Unlike analog transmission, digital transmission is concerned with the content of the signal. A typical digital transmission system includes repeaters (not shown) which recover the content of the signal and then regenerate and retransmit a new signal with the same content.

The public switched telephone network (PSTN) is the preferred circuit-switched communication network 118. In this context, the PSTN refers to the worldwide voice telephone system. Once only an analog system, the heart of most telephone networks today is digital. In the United States, most of the remaining analog lines are the ones from homes and offices to the telephone company's central office. It is not difficult to imagine that some day these lines will also be digital.

The circuit-switched communication network 118 is coupled to converter 126 which serves to convert the telephone signals into digitized packets. Converter 126 can also be referred to as a gateway, a digitizer or an encoder. For voice communications, the conversion function would include sampling the voice signals and generating digitized representations. This digital sample data can then be combined with packet headers and footers in a manner consistent with the protocol used on packet-switched network 130. While Internet Protocol (IP) is preferred, the precise protocol used is not critical to the claimed invention. In general, converter 126 may convert signals from a first network (e.g., circuit-switched network 118) into a digital protocol which can be routed through packet-switched network 130.

Figure 3:
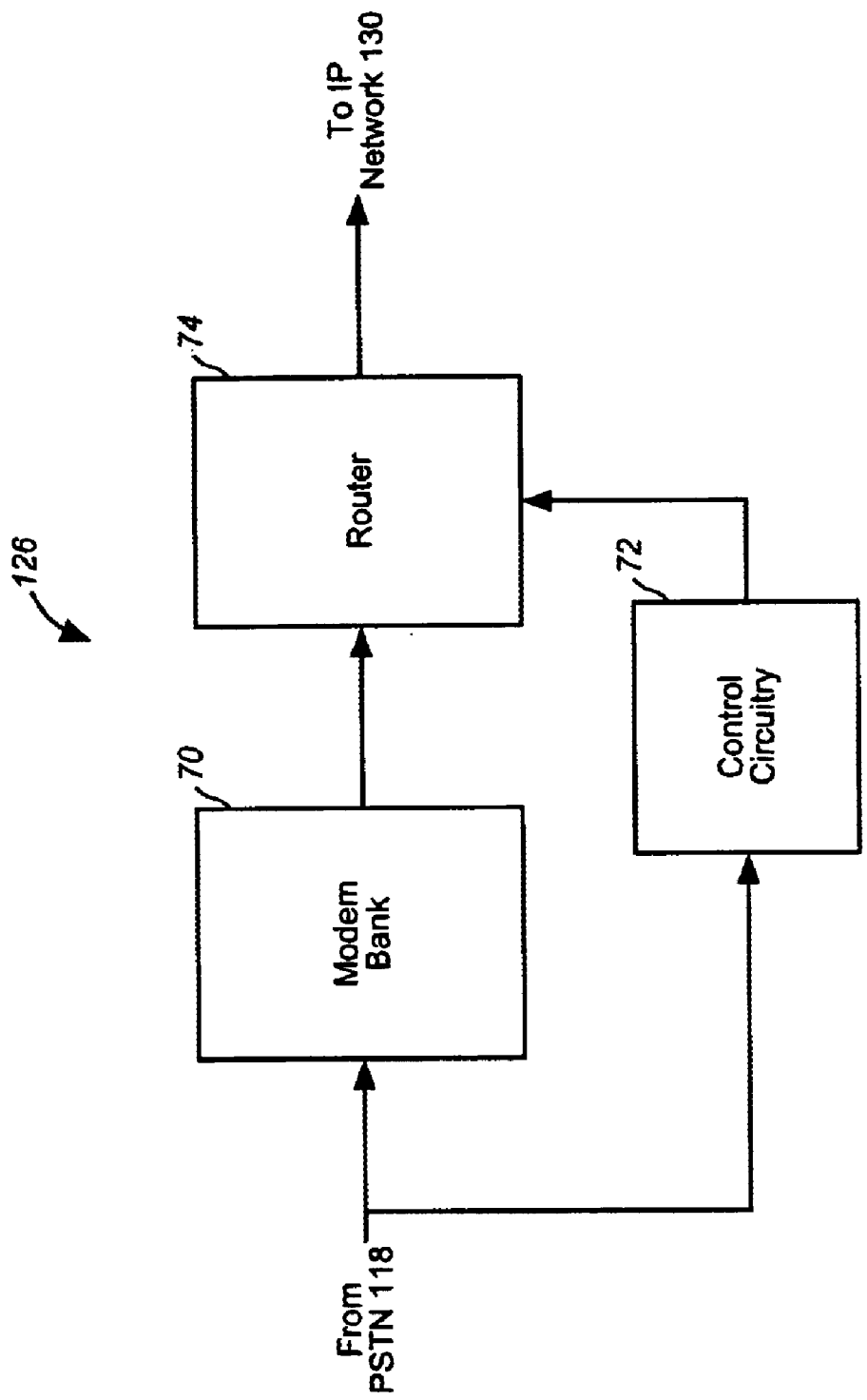
FIG. 3 is a block diagram of a portion of the system of FIG. 2.

FIG. 3 illustrates a simplified block diagram of a converter 126. The converter receives telephone signals from circuit-switched network 118. These signals are provided to a modem 70 and control circuitry 72. The modem translates the signals into digital signals which can be handled by router 74. The control circuitry 72 utilizes the signaling information to generate the packet addressing information for router 74. In the preferred embodiment, control circuitry 72 comprises a processor based system such as a computer or specialized hardware. The control circuitry 72 can be embedded within router 74. The router then provides packetized information to the packet-switched network 130.

In general the PSTN to IP-network gateway (i.e., converter 126) should be able to support the translation of PCM to multiple encoding schemes to interwork with software from various vendors. Alternatively, a common compression scheme could be used. Commercially available products such as the WebPhone Gateway Exchange server by Netspeak can be used to act as the bridge between conventional circuit-switched telephone systems and IP-based data networks.

Returning to FIG. 2, packet-switched network 130 comprises a plurality of digital links capable of handling digital signals. Packet-switched network 130, sometimes referred to as a converged network, combines various types of media such as voice calls, data and streams of video onto a single line. All these different media are chopped into chunks of data or packets. In the preferred embodiment, packet-switched network 130 is an Internet Protocol-based (IP-based) network.

One example of an IP-based network is the public Internet. In this context, the "Internet" (uppercase "I") is used to connote the worldwide collection of interconnected networks that uses Internet Protocol (IP) to link a large number of physical networks into a single logical network. Physically, the Internet is a huge, global network spanning nearly 100 countries and comprising a great number of academic, commercial, government, and military networks.

Packet-switched network 130 could also comprise other IP-based networks as well as other communication networks. For example, packet-switched network 130 could comprise an internet which is not connected to the public Internet. In this context, an "internet" (lowercase "i") is any collection of separate physical networks, interconnected by a common protocol, to form a single logical network. An internet would preferably, but not necessarily use Internet Protocol. An internet which is owned by a single entity is sometimes referred to as an intranet. Network 130 can comprise an intranet, which is or is not connected to the Internet.

Server processor 128 is a computer system coupled to packet-switched network 130 and executes server software to perform the tasks required by the present invention. In a find-me/follow-me system, for example, server processor 128 performs the function of taking the incoming phone number generated at telephone 114 and querying database 138 looking up the forwarding phone numbers assigned to the user. In FIG. 2, server processor 128 is represented by a single computer. It is noted, however, that the software executed on server processor 128 can just as easily operate over a number of computers which may be physically close together or found at remote locations many miles apart. Accordingly, server processor 128 can comprise a number of interlinked computers. For the purposes of this invention, the hardware is not critical. The emphasis, rather, is on the functionality of that hardware. This functionality is discussed in greater detail with respect to FIG. 4.

Figure 4:
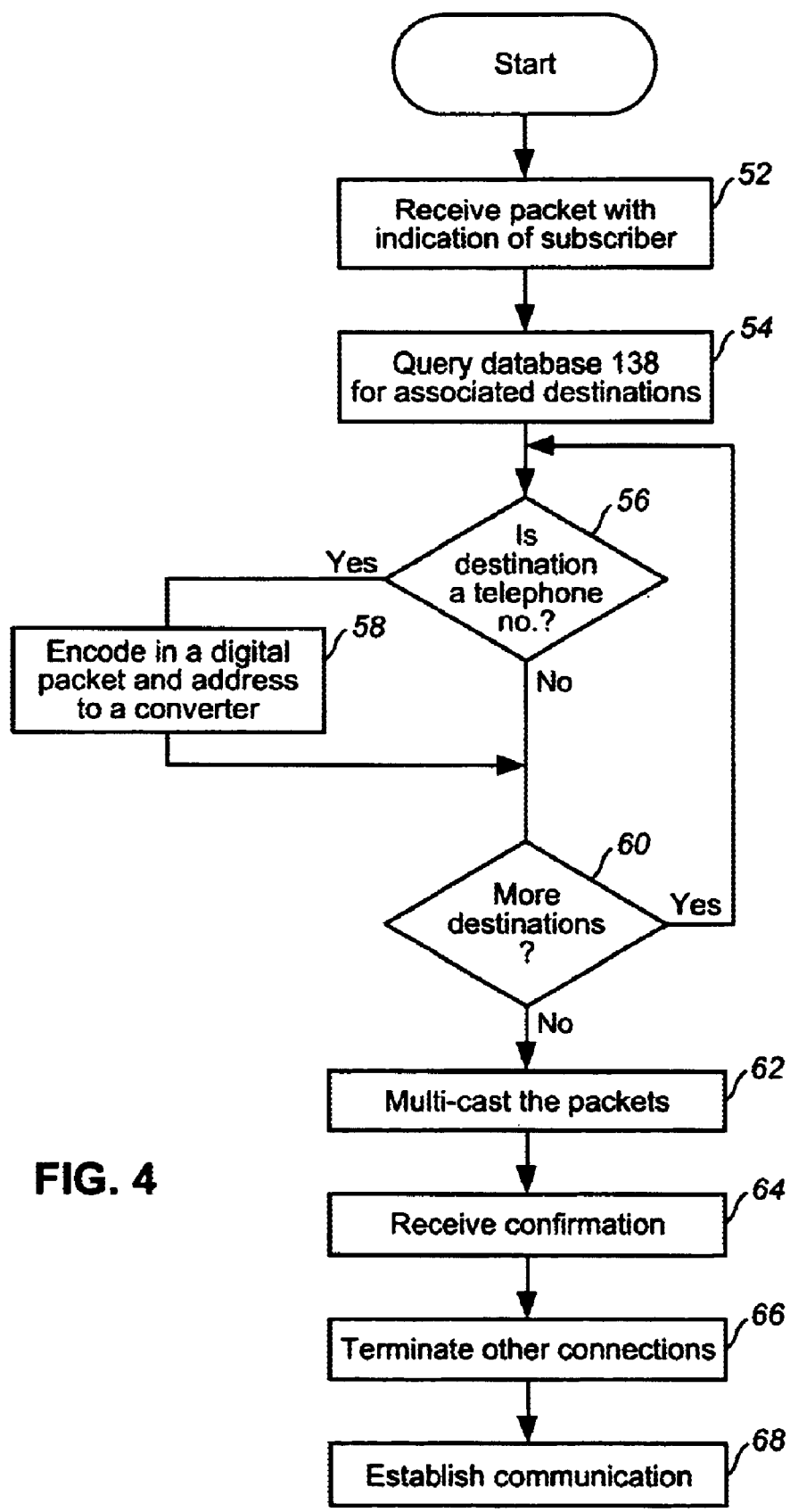
FIG. 4 is a flow chart of exemplary software which can operate on a computer system in the communication system of FIG. 2 or FIG. 6.

FIG. 4 is a flowchart of the software which will execute on server processor 128. In Step 52, server processor 128 receives one or more packets which include an indication of the called party. As a component on packet-switched network 130, server processor 128 has been assigned an address, e.g., an IP address. In the case where the process is initiated by a telephone call, the called party's telephone number or subscriber number has been encoded by a converter 126 which sent the packet to the assigned address.

Server processor 128 extracts the subscriber identification information from the packet and queries database 138 (discussed in more detail below). This task is illustrated by step 54. Database 138 stores a series of destinations associated with each subscriber. These destinations are returned to server processor 128.

Server processor 128 next goes through each destination and creates IP packets. For telephone number destinations, the number is encoded within the body of the packet and the packet is addressed for a converter 132 (discussed in more detail below). In the preferred embodiment, a number of converters 132 can have the same IP address. These tasks are illustrated by steps 56, 58 and 60.

Server processor 128 will then multicast the packets to each of the destinations 132, 134. Multicasting in data communication networks refers to transmitting a message to multiple recipients at the same time. Multicast is a one-to-many transmission similar to broadcasting, except that multicasting implies sending to a list of specific users, whereas broadcasting implies sending to everybody. IP multicasting refers to transmitting data to a group of selected users at the same time on a TCP/IP network (internal, intranet or Internet). The information is transmitted once, and all intended users receive it at the same time.

After multicasting the packets, server processor 128 awaits a response from one of the destinations 132, 134. Upon receipt of the confirmation in step 64, server processor 128 terminates the connections with each of the other destinations as illustrated by step 66. A communication connection can then be established between the telephone caller at telephone 114 and the called party at, for example, telephone 120b.

Returning now to FIG. 2, the remaining elements in system 110 are described. As mentioned, server processor 128 is coupled to database 138. While not illustrated, server processor 128 may be coupled to database 138 through packet-switched network 130 or through another network (not shown). The physical connection of these two entities is not critical to the present invention.

Database 138 is stored in a mass storage unit or units (not shown) and comprises information required by system 110. The mass storage unit is preferably a hard disk drive or an array of hard disk drives. In a find-me/follow-me system, for example, database 138 will include a number of find-me/follow-me telephone numbers for each subscriber to the system. The database 138 will also include other subscriber information such as forwarding priorities and other information. Database 138 could also store subscriber billing information. Database 138 can comprise a single logical database or a number of logically distinct databases. The hardware which implements database 138 can be centralized (i.e., one or more units at a single location) or distributed (i.e., at many remote locations).

Database 138 is preferably arranged so that is can be accessed by the subscriber at any time. For example, the subscriber should be able to log onto the ISnternet and change or add telephone numbers where he can be reached. Alternatively, the subscriber can call a telephone number and update database 138 with the assistance of an automated or human operator.

In the illustrated embodiment, packet-switched network 130 is also coupled to a number of receiving communication devices including telephones 120a and 120b (generically 120) and computers 134a and 134b (generically 134). In general, these devices can be grouped into two classes. The first class, exemplified by computer 134, includes digital devices. A digital device is a device that can utilize the same protocol as packet-switched network 130. This type of device 134 can be connected directly to the network 130 in a logical sense. The other class of devices is analog devices, as exemplified by telephone 120. Signals transmitted from an analog device require a conversion process in order to communicate with packet-switched network 130, even if the underlying signals are digital signals.

In FIG. 2, computer 134b is coupled to packet-switched network 130 through modem 140, circuit-switched network 136 and modem 142. This type of connection may be necessary when a user does not have direct access to a packet-switched network, for example a home PC. For the purpose of this invention, computer 134b is considered a digital device, even if modem 142 is an analog modem because from a logical viewpoint, computer 134b can be assigned an IP address and communicate with other components on the network 130 using the same protocol. An example of a computer 134b is a personal computer which includes a modem and executes a browser (e.g., Netscape Navigator or Microsoft Explorer) and is connected via telephone lines to an Internet service provider.

Alternatively, computer device 134a or 134b could be coupled to packet-switched network 130 through a cable modem, a wireless link (e.g., satellite or cellular), a connection through a T1 line, a digital subscriber line (e.g., ADSL), or even power lines. This connection can be either a digital or an analog connection.

Converters 132a and 132b are coupled to packet-switched network 130 to convert the digital packets from network 130 into signals which can be transmitted across circuit-switched network 136. In the preferred embodiment, converter 132 comprises the same elements as converter 126 and is illustrated in FIG. 3. In the preferred embodiment, converters 126 and 132 are interchangeable depending on which device 114, 120, or 134 initiates the call and where this initiation is routed.

Circuit-switched network 136 is a network similar to network 118. In fact, these networks 118 and 136 may comprise a single network. In fact, when someone uses a find-me/follow-me telephone number to call a coworker in the same building, the network 118 may utilize the same physical phone lines as network 136. Once again, the public switched telephone network is the preferred embodiment circuit-switched network.

Analog communication devices 120 are coupled to circuit-switched network 136. Examples of analog communication devices include telephones, pagers, and cellular towers which transmit to cellular phones and other equipment. Analog communication devices cannot use the same protocol as packet-switched network 130 without some intermediary translation (e.g., in converter 132).

Figure 5:
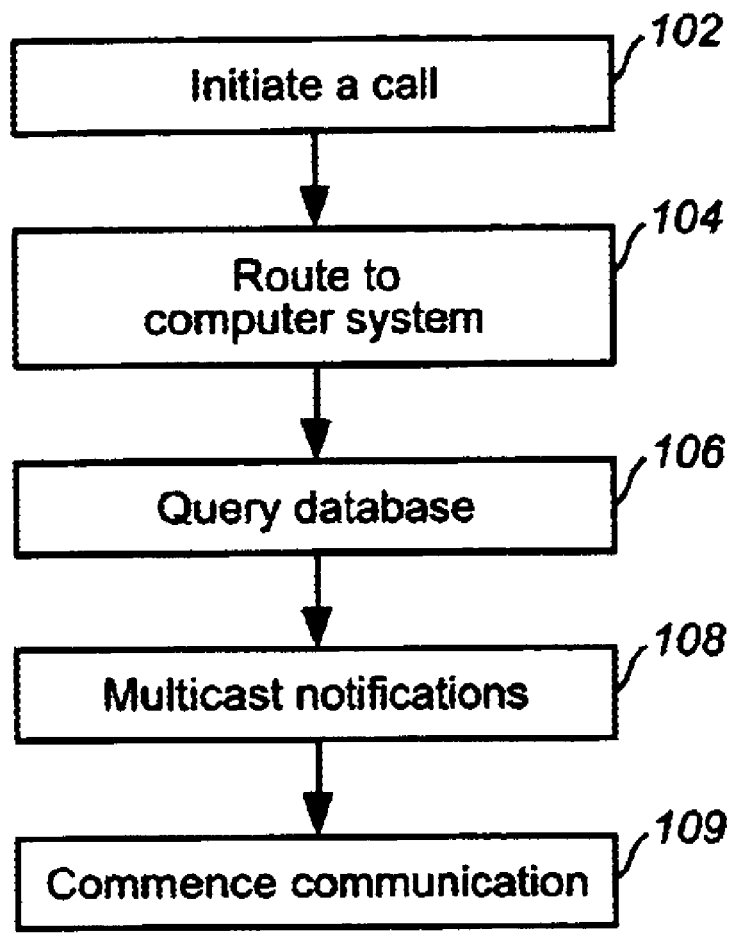
FIG. 5 is a flow chart of a preferred embodiment method of the present invention.

The operation of the present invention will now be described by providing a specific example of a service which could be provided. The following list of procedures assumes that standard error handling procedures are used. In the preferred embodiment, errors are handled by standard TCP/IP transmission level protocols. The service would have the following steps as illustrated by the flow chart of FIG. 5.

1. Using standard phone service and equipment 114, a caller dials a called party's find-me phone number (Step 102). This telephone number may be a specific phone number, either local or toll-free (e.g., 800 or 888 area code). Alternatively, multiple subscribers can share a single telephone number where each has a unique identification code which would be entered by the caller.

2. The phone call is routed to a find-me server processor 128 through a packet-switched network 130 (Step 104). For example, the call may reach the Internet via an Internet Service Provider (ISP).

3. Follow-me server processor 128 performs a lookup to database 138 for the called party's designated destination numbers (Step 106). The database 138 has been set up beforehand by entering the TCP/IP based destination in the called party's profile. As discussed above, database 138 can be a standard database to store and retrieve phone number lists provided by the called party. The system should preferably support either static or dynamic addresses. In a static addressing scheme, each network interface is assigned a unique physical address. The address may be assigned by the hardware manufacturer or configured by the user. A dynamic addressing scheme provides a mechanism that automatically assigns a physical address to a station when the station first boots. In the embodiment illustrated in FIG. 2, database 138 would include telephone numbers for telephones 120a and 120b and IP addresses for computers 134a and 134b.

4. Using the data identified in step 3, the server processor 128 simultaneously issues a call notification to each of the receiving communication devices 120, 134 (Step 108). In the illustrated embodiment, server processor 128 would multicast the call notification to the IP addresses of converters 132 and computers 134. The converters 132 will translate the call notification and cause telephones 120 to ring. One feature of this invention is that all of the call numbers on the called party's follow-me destination list will ring simultaneously (within the delays associated with the various equipment in the system). An example of this step was described above with respect to step 62 in FIG. 4. This provides an advantage over present commercially available systems which require sequential dialing.

When the called party has designated a computer 134 as a destination, the computer is notified at this time to alert the called party of an incoming phone call. If the computer 134 is online, a message is sent to the called party requesting call completion. If not, the call is handled through standard follow-me call processing. This case is similar to a busy signal at a telephone 120.

5. The first destination to answer initiates voice digitization at the server processor 128. Upon receipt of a pickup notification, server processor 128 will terminate the call notification to each of the other receiving devices 120, 134. An example of this step was described above with respect to steps 64 and 66 of FIG. 4. The connection can then be commenced.

If none of the destination devices 120, 134 respond, the caller can be forwarded to a secondary group of devices, e.g., a pager or voice mail. In fact, the system can be organized into as many groups of devices as desired. The user can have the ability to program which devices go in which group. The system would operate by simultaneously trying all of the devices in the primary group, then, if no answer is received, simultaneously trying all of the devices in the secondary group, then, if still no answer is received, simultaneously trying all of the devices in the tertiary group, and so on. Preferably, the final group includes a pager and/or voicemail so that the caller can leave a message with the called party.

6. The voice packets are then routed to the destination which responded to the call (Step 109). When the call is completed by an analog device 120 (e.g., a telephone), the digitized packets are reassembled by the converter 132 into a voice stream on the called party's end. When the call is completed to a digital device 134 (e.g., a computer) the digital device 134 itself (along with specialized software) reassembles the packets. At this point, the call is completed and conversation commences. In the case of a call to a computer 134, the called party can use a microphone and soundcard/speakers to complete the call using his PC.

While described with respect to audio (e.g., voice), it is understood that data, video or combinations of all three could just as easily be used. Audio, data and video telephony over packet-switched networks is described in greater detail in co-pending application Ser. No. 08/751,205, which is incorporated herein by reference.

This system reduces the waiting time of the caller by simultaneously ringing all numbers in each group of number retrieved from database 138. This system also reduces switch traffic for the telephone companies by letting Internet service providers do the routing, in effect turning the Internet service providers into mini-telephone companies. This system has all of the functionality of standard follow-me type phone systems, but with the added capability of catching the called party online anywhere in the world as long as they are connected to the ISP in some manner.

The invention can also utilize the "Finger the ISP" concept; i.e. the ISP runs the finger query to determine where a customer is located. Using this command, one can identify a user's IP address and other information. For example, if the command "finger user@ aol.com" is run, the system would return the user's IP address, along with how long the user has been on line, and other information. It is noted, however, that many corporate firewalls may prevent this function as a security measure.

Figure 6:
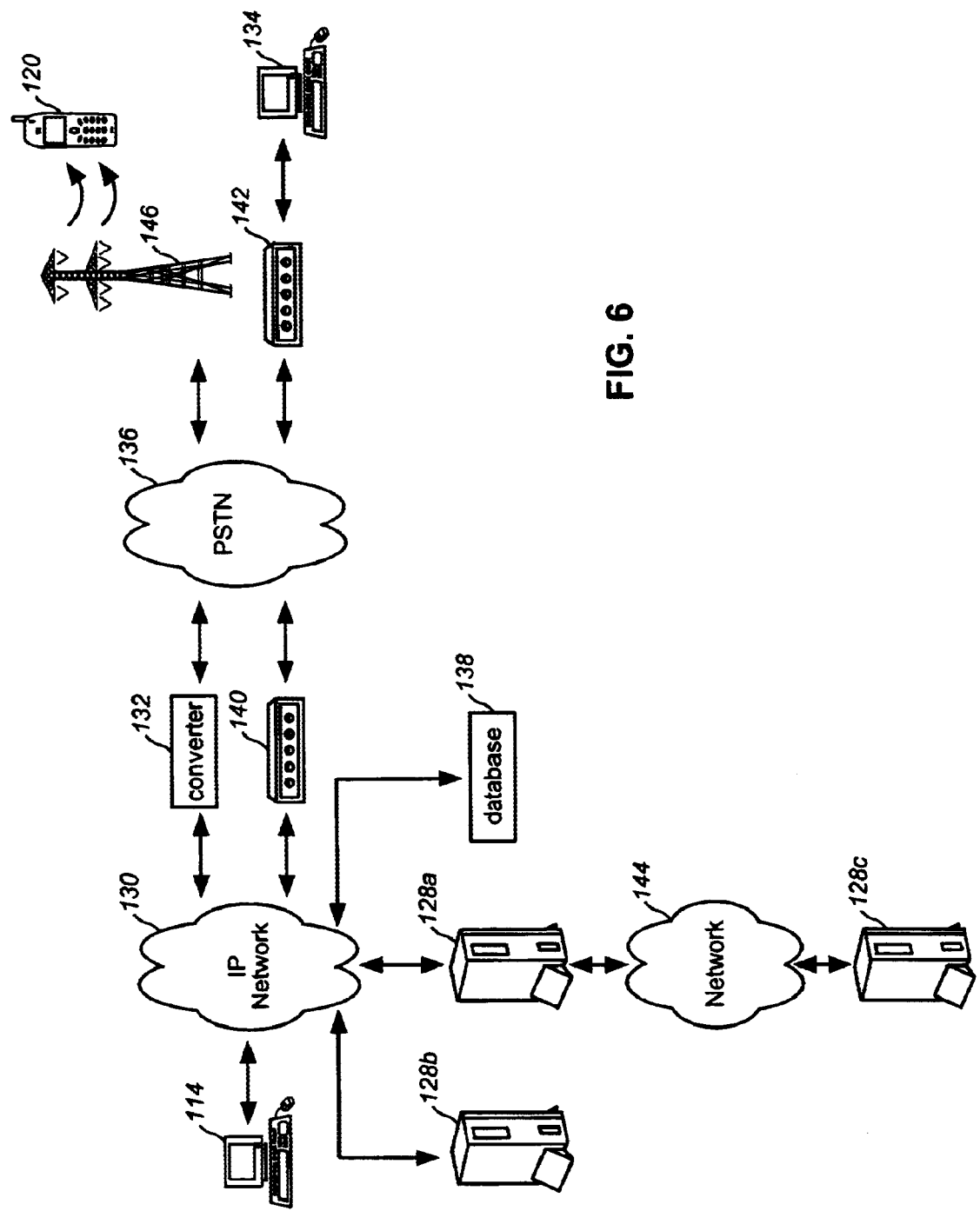
FIG. 6 is a block diagram of an alternate embodiment communication system.

The present invention has thus far been described with respect to a particular application, albeit one with a number of variations. Several modifications, however, are contemplated without deviating from the inventive concepts described herein. FIG. 6 is presented to illustrate a number of these modifications. All or some of these modifications could be combined with the system shown in FIG. 2.

As a first modification, initiating device 114 could be a computer as illustrated in FIG. 6. Initiating computer 114 is typically a personal computer (regardless of platform, processor type or operating system) with a Web browser and Internet access. Computer 114 may alternatively comprise a network of computers (e.g., for corporate clients using a local area network or other network), a multiprocessor computer such as a workstation, or a terminal which only allows access to network 130 (e.g., WebTV).

Computer 114 can be connected to the packet-switched network 130 in any of a number of ways. For example, the computer 114 may have a modem (analog or digital), a cable modem, a wireless link (e.g., satellite or cellular), a connection through a T1 line, a digital subscriber line (e.g., ADSL), or even the power lines. The computer 114 can also be connected to a network, for example, to a corporate intranet which includes a gateway to the Internet.

FIG. 6 also illustrates some of the variations discussed above but not shown in FIG. 2. For example, the computer system for server processor 128 is illustrated in three subsystems 128a, 128b, and 128c. Subsystem 128a is coupled to subsystem 128b through packet-switched network 130 and coupled to subsystem 128c through a separate network 144. In addition, database 138 is illustrated as being coupled to server processor 128 via packet-switched network 130.

Finally, FIG. 6 shows a cellular communications system transmit/receive tower 146 coupled to PSTN 130 to transmit and receive signals to and from cellular phone 120.

The present invention could also be utilized in embodiments other than find-me/follow-me systems. For example, the initiation of a teleconference could be facilitated by use of the present invention. The following list provides the steps for such a system. The steps of FIG. 5 can once again be followed.

1. A list of the conferees of a conference call are assembled and stored in database 138. This list would, for example, include telephone numbers for each person involved in the conference. To expand the concept, any of these numbers could be find-me or follow-me numbers as described above. The list could be created by accessing database 138 via computer or telephone (e.g., touch-tone information entry). Alternatively, a user could call an operator (human or automated) who enters the information in database 138.

2. The conference call is initiated by sending a call notification to server 128 (Steps 102 and 104). This initiation could be performed by one of the participants of the conference call or a third party such as an operator. The initiation could comprise calling a special telephone number or calling a general number and entering a confirmation number (and/or password).

3. Conference server processor 128 performs a lookup to database 138 for the called parties' designated destination numbers (Step 106).

4. Server processor 128 simultaneously issues a call notification to each of the parties designated in the database (Step 108). The present invention does not limit the communication device used by each party. Any combination of devices could be used. For example, some participants could be on a land-line telephone, others on a cellular phone and still others over a computer. As before, server processor 128 multicasts the call notification to the IP addresses associated with each device causing all of the devices to ring simultaneously. With calls to telephones 120, converters 132 will translate the call notification and cause telephones 120 to ring. Once again, an advantage over present commercially available systems is attained be eliminating the requirement of sequential dialing.

5. In this embodiment, unlike the follow-me service, the first destination to answer will not cause the termination of the notification to all other destinations. Rather, the system will link up each of the destinations in a conference call (Step 109). Conference calling over a packet-switched network, such as the Internet, is described in greater detail in co-pending application Ser. No. 08/751,203, which is incorporated herein by reference.

The conference can be carried out with data, video (real-time or not), audio, and combinations of all or some of the three. For example, a real-time video of one of the participants could be transmitted to all of the other participants while audio from each participant is transmitted to all of the other participants (i.e., so all participants see one participant but hear all of the participants). Other variations are also possible.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communication to a called party, comprising:
   receiving a request for a call to a telephone number of the called party initiated from a telephone on a circuit-switched network;
   determining multiple destinations associated with the called party based on the telephone number; and
   initiating simultaneous transmission of multiple call notifications over a packet-switched network to the multiple destinations, wherein at least one of the destinations is a telephone, pager, or voice mail system.

2. The method of claim 1 wherein the step of determining multiple destinations includes looking up a plurality of Internet Protocol (IP) addresses based on the telephone number.

3. The method of claim 2 wherein the step of initiating includes simultaneously initiating contact with each of the plurality of IP addresses based on the telephone number.

4. The method of claim 1 wherein at least one of the destinations is a computer device.

5. The method of claim 1 further comprising:
   receiving a receipt notification from one of the destinations and,
   in response, canceling the call notification to each of the other destinations.

6. The method of claim 1 further comprising establishing a communication with at least one of the multiple destinations.

7. A method for communication, comprising:
   receiving a call notification for a called party;
   extracting identification information of the called party from the call notification;
   determining multiple destinations associated with the called party;
   initiating simultaneous transmission of multiple call notifications over a packet-switched network to the multiple destinations, wherein at least one of the destinations is selected from a group consisting of a telephone, pager, and voice mail system; and
   establishing a communication with more than one of the destinations.

8. The method of claim 6 wherein the established communication comprises an audio communication.

9. A communication system comprising:
   a plurality of converters having a same network address, each converter operable to sample voice signals and create digital packets containing a representation of the voice signals;
   a storage device containing a database of records, each record including a call list of telephone numbers associated with each of a plurality of subscribers; and
   a computer system operable, upon receipt of a call notification from a caller to a subscriber, to query the database to retrieve a record associated with the subscriber and initiate simultaneous transmission of digital call notification packets to a plurality of the converters at the same network address, the digital notification packets including information relating to the call list of telephone numbers in the received record.

10. The system of claim 9 wherein each of the converters comprises:
   at least one modem;
   a router coupled to the modem; and
   control circuitry coupled to both the modem and the router.

11. The system of claim 9 wherein the computer system communicates with the converters through an internet.

12. The system of claim 11 wherein the same network address is a same Internet Protocol (IP) address.

13. The system of claim 9 wherein the computer system comprises a plurality of interlinked computers.

14. The system of claim 9 and further comprising a plurality of communication devices, each communication device coupled to receive a call notification from the caller via one of the converters.

15. The system of claim 9 wherein each converter is also operable to create voice signals from a digital packet.

16. A communication system comprising:
   means for accessing a plurality of data records in response to a request for call to a telephone number of a subscriber initiated from a telephone on a circuit-switched network, each data record including a list of addresses of respective communication devices associated with each of a plurality of subscribers;

means for initiating simultaneous transmission of digital call notification packets via a packet-switched network, the digital notification packets addressed to each of the addresses associated with a subscriber; and means for forwarding one of the digital call notification packets from the packet-switched network to a corresponding one of communication devices via a circuit-switched network.

17. The system of claim 16 wherein at least some of the addresses comprise telephone numbers.

18. The system of claim 16 wherein at least some of the addresses comprise IP addresses.

19. The method of claim 1, wherein the multiple transmission includes an IP (Internet, Protocol) muticast transmission.

20. The system of claim 16, wherein the means for forwarding is further configured for translating the digital call notification into an analog signal that causes the corresponding one of the communication devices to ring.

21. A method for communication over a packet-switched network, the method comprising the steps of:

receiving a call notification for a called party;

extracting identification information of the called party from the call notification;

determining multiple destinations associated with the called party;

initiating simultaneos transmission of multiple call notifications over the packet-switched network to the multiple destinations; and forwarding at least one of the multiple call notifications from the packet-switched network to a device via a circuit-switched network.

22. The method of claim 21 wherein the device is a telephone, pager, or voice mail system.

23. The system of claim 21 wherein the step of forwarding include translating the digital call notification into an analog signal that causes the corresponding one of the communication devices to ring.

24. A method for communication over a packet-switched network, the method comprising the steps of:

receiving a call notification for a telephone number;

determining multiple destinations associated with the telephone number; and initiating simultaneous transmission of multiple call notifications over the packet-switched network to the multiple destinations; and establishing a conference communication with a plurality of the multiple destinations.

* * * * *